United States Patent
Ogawa et al.

(10) Patent No.: US 11,936,003 B2
(45) Date of Patent: Mar. 19, 2024

(54) BATTERY

(71) Applicant: Prime Planet Energy & Solutions, Inc., Tokyo (JP)

(72) Inventors: Shuji Ogawa, Fukutsu (JP); Takafumi Tsukagoshi, Kasai (JP); Kazuya Ikeshita, Minamiawaji (JP); Kazuki Hiramatsu, Kasai (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 69 days.

(21) Appl. No.: 17/499,873

(22) Filed: Oct. 13, 2021

(65) Prior Publication Data
US 2022/0131197 A1    Apr. 28, 2022

(30) Foreign Application Priority Data
Oct. 22, 2020 (JP) .................. 2020-177173

(51) Int. Cl.
*H01M 10/0587* (2010.01)
*H01M 10/0525* (2010.01)

(52) U.S. Cl.
CPC ... *H01M 10/0587* (2013.01); *H01M 10/0525* (2013.01)

(58) Field of Classification Search
None
See application file for complete search history.

(56) References Cited

U.S. PATENT DOCUMENTS

| | | |
|---|---|---|
| 6,190,794 B1 | 2/2001 | Wyser |
| 2004/0232882 A1 | 11/2004 | Yanagawa et al. |
| 2006/0073380 A1 | 4/2006 | Kim et al. |
| 2013/0071712 A1 | 3/2013 | Sasaki |
| 2018/0034109 A1* | 2/2018 | Wang .................. H01M 10/286 |

(Continued)

FOREIGN PATENT DOCUMENTS

| | | |
|---|---|---|
| CN | 1574441 A | 2/2005 |
| CN | 102893439 A | 1/2013 |
| FR | 3037724 A1 | 12/2016 |

(Continued)

OTHER PUBLICATIONS

English language machine translation of WO-2020110975-A1. (Year: 2023).*

*Primary Examiner* — Eli S Mekhlin
(74) *Attorney, Agent, or Firm* — HAUPTMAN HAM, LLP (57) ABSTRACT

A battery includes a wound electrode assembly. The wound electrode assembly has a flat shape. The wound electrode assembly includes a first separator, a positive electrode plate, a second separator, and a negative electrode plate. The first separator, the positive electrode plate, the second separator, and the negative electrode plate are stacked in this order and then wound spirally. In a cross section perpendicular to a winding axis of the wound electrode assembly, the first separator has a first winding start edge inside an innermost circumference of the wound electrode assembly; the second separator has a second winding start edge inside the innermost circumference of the wound electrode assembly; the first winding start edge faces the second winding start edge with the winding axis interposed therebetween; and the first winding start edge is located apart from the second winding start edge.

7 Claims, 6 Drawing Sheets

(56) References Cited

U.S. PATENT DOCUMENTS

2018/0190962 A1    7/2018  Masson

FOREIGN PATENT DOCUMENTS

| | | | |
|---|---|---|---|
| JP | 2004103485 A | 4/2004 | |
| JP | 2007026939 A | 2/2007 | |
| JP | 2008091076 A | 4/2008 | |
| JP | 201190917 A | 5/2011 | |
| WO | 2013047515 A1 | 4/2013 | |
| WO | WO-2020110975 A1 * | 6/2020 | ........ H01M 10/0525 |

* cited by examiner

Table 1

| | No.1 | No.2 | No.3 | No.4 | No.5 | No.6 | No.7 |
|---|---|---|---|---|---|---|---|
| Separator layout | | | | | | | |
| Separator thickness [µm] | 16 | 18 | 20 | 16 | 18 | 16 | 16 |
| Separator rigidity index [mm] | 17.2 | 18 | 19.2 | 17.2 | 18 | 17.2 | 17.2 |
| Clearance distance d [mm] | 0 | 0 | 0 | 5 | 5 | 10 | 44 |
| Innermost circumference*) | B | A | A | B | A | A | A |

*) "A" indicates that no folding and/or overlapping was observed at the tip of the separator inside the innermost circumference of the wound electrode assembly after pressing.
"B" indicates that folding and/or overlapping was observed at the tip of the separator inside the innermost circumference of the wound electrode assembly after pressing.

Fig. 9

BATTERY

This nonprovisional application is based on Japanese Patent Application No. 2020-177173 filed on Oct. 22, 2020, with the Japan Patent Office, the entire contents of which are hereby incorporated by reference.

BACKGROUND OF THE INVENTION

Field of the Invention

The present disclosure relates to a battery.

Description of the Background Art

Japanese Patent Laying-Open No. 2011-090917 discloses a wound electrode assembly.

SUMMARY OF THE INVENTION

An electrode plate and a separator are wound around a core to form a cylindrical wound electrode assembly. The core is pulled out of the wound electrode assembly, and then the wound electrode assembly is shaped into a flat shape. The wound electrode assembly may have various sizes and dimensions, depending on the specifications of the battery. For example, a wound electrode assembly with a small roll diameter is sought after. A wound electrode assembly with a small roll diameter may be shaped into a flat shape to form a wound electrode assembly with a small height dimension. The roll diameter may be adjusted by changing the diameter of the core. The diameter of the core is decreased to make the roll diameter small.

An object of the present disclosure is to provide a wound electrode assembly suitable for a small roll diameter.

Hereinafter, the technical configuration and effects of the present disclosure will be described. It should be noted that the action mechanism according to the present disclosure includes presumption. The scope of claims should not be limited by whether or not the action mechanism is correct.

[1] A battery includes a wound electrode assembly. The wound electrode assembly has a flat shape. The wound electrode assembly includes a first separator, a positive electrode plate, a second separator, and a negative electrode plate. The first separator, the positive electrode plate, the second separator, and the negative electrode plate are stacked in this order and then wound spirally. In a cross section perpendicular to a winding axis of the wound electrode assembly, the first separator has a first winding start edge inside an innermost circumference of the wound electrode assembly; the second separator has a second winding start edge inside the innermost circumference of the wound electrode assembly; the first winding start edge faces the second winding start edge with the winding axis interposed therebetween; and the first winding start edge is located apart from the second winding start edge.

Figure 1:
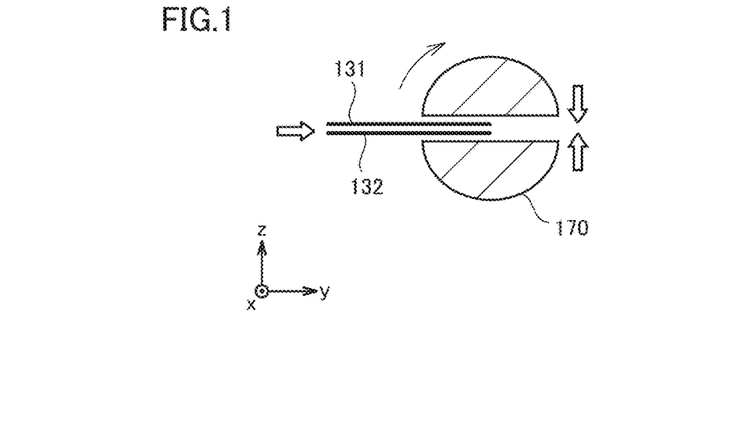
FIG. 1 is a first schematic view illustrating a process of production of a wound electrode assembly.

FIG. 1 is a first schematic view illustrating a process of production of a wound electrode assembly.

In the wound electrode assembly, two separators are used. More specifically, a first separator 131 and a second separator 132 are used. Hereinafter, in the present specification, first separator 131 and second separator 132 may be collectively called "the separator".

A core 170 is a rod-like component. Core 170 extends in a direction perpendicular to the surface of the paper (in the x-axis direction). Core 170 has a gap in its central part. The separator is inserted into the gap of core 170, and thereby the separator is immobilized. After the separator is thus immobilized, core 170 is rotated to wind up the separator. While core 170 is being rotated, at a predetermined timing, a positive electrode plate (not illustrated) is inserted from one side, and a negative electrode plate (not illustrated) is inserted from the other side, between a first separator 131 and a second separator 132, to be wound up by core 170.

Typically, first separator 131 and second separator 132 are inserted into core 170 from the same direction. In this case, the tip of first separator 131 overlaps with the tip of second separator 132 inside the innermost circumference of the wound electrode assembly.

Figure 2:
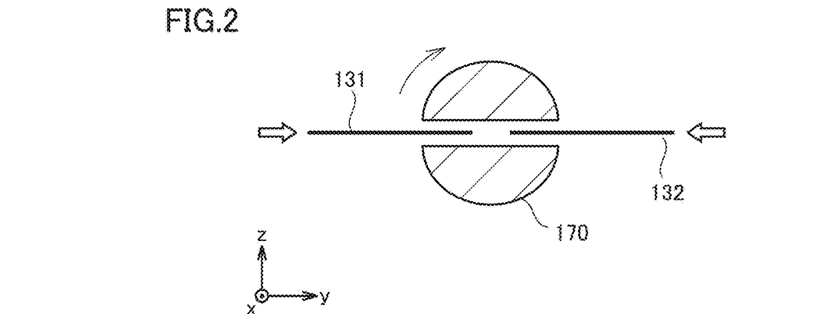
FIG. 2 is a second schematic view illustrating a process of production of a wound electrode assembly.

FIG. 2 is a second schematic view illustrating a process of production of a wound electrode assembly.

In a winding-up method according to the present disclosure, the direction from which first separator 131 is inserted is opposite to the direction from which second separator 132 is inserted. The winding-up method according to the present disclosure makes it possible to obtain a structure in which the tip of first separator 131 does not overlap with the tip of second separator 132 inside the innermost circumference of the wound electrode assembly.

Figure 3:
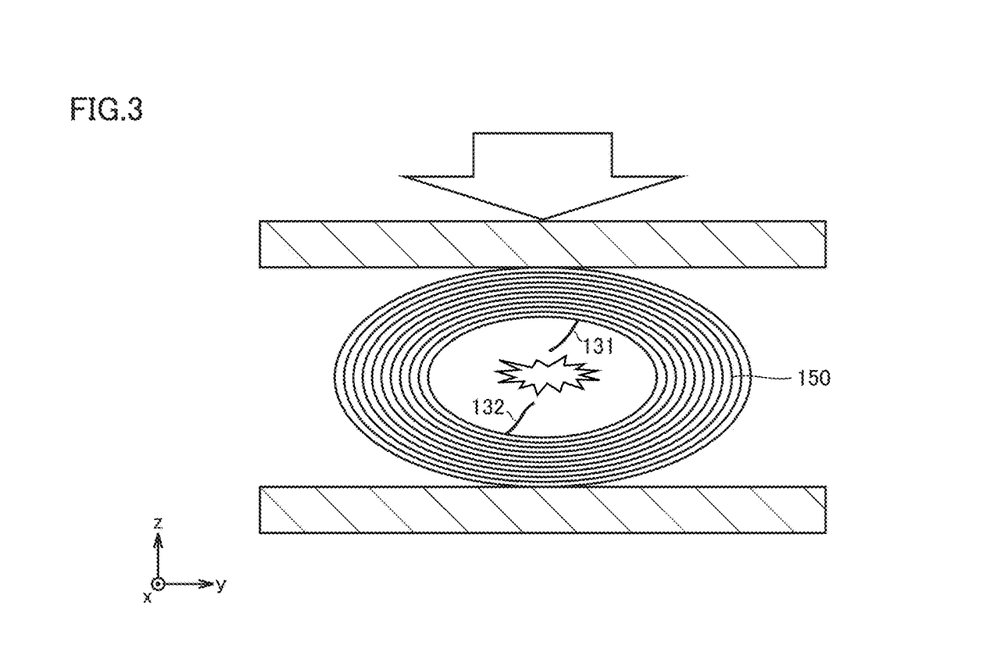
FIG. 3 is a third schematic view illustrating a process of production of a wound electrode assembly.

FIG. 3 is a third schematic view illustrating a process of production of a wound electrode assembly.

After winding-up, core 170 is pulled out of a wound electrode assembly 150. Further, wound electrode assembly 150 is pressed into a flat shape. Inside the innermost circumference of wound electrode assembly 150, the tip of first separator 131 faces the tip of second separator 132. Because of this, at the time of pressing, the tip of first separator 131 may come into contact with the tip of second separator 132. As a result, a folded and/or overlapped portion may be formed in at least one of the tip of first separator 131 and the tip of second separator 132. When the separator is folded and/or overlapped inside the innermost circumference, a thickness dimension of wound electrode assembly 150 (the dimension in the z-axis direction in FIG. 3) may be too large, for example.

The smaller the roll diameter of wound electrode assembly 150 is, the closer the tip of first separator 131 approaches the tip of second separator 132. As a result, at the time of pressing, the tip of first separator 131 tends to come into contact with the tip of second separator 132.

In the present disclosure, pressing is carried out in a manner so as to avoid contact between the tip of first separator 131 and the tip of second separator 132. As a result, inside the innermost circumference of the shaped, wound electrode assembly 150, the tip of first separator 131 (a first winding start edge) is located apart from the tip of second separator 132 (a second winding start edge). Thereby, folding and/or overlapping of the separator inside the innermost circumference is avoided, enabling consistent production of wound electrode assembly 150 with a small roll diameter.

[2] Each of the first separator and the second separator may have a thickness of 20 µm or less and a rigidity index of 18 mm or more, for example. The rigidity index means a height of the separator (which has a length of 30 cm) from a surface of a platform when the separator is placed on the platform and folded back with both edges joined together and with no crease.

A separator with a thickness of 20 µm or less tends to have a low rigidity. When the separator has a low rigidity, the upper separator (first separator 131) tends to go downward, as in FIG. 3, and thereby first separator 131 tends to come into contact with second separator 132. When the separator has a certain level of rigidity or more, the downward movement of the separator tends to be inhibited, regardless of whether the separator is thin or not. More specifically, when the rigidity index is 18 mm or more, the downward movement of the separator tends to be inhibited.

[3] A distance between the first winding start edge and the second winding start edge may be from 10 mm to 44 mm, for example.

[4] The structure of a wound electrode assembly according to the present disclosure may be specified as below, for example.

That is, in a cross section perpendicular to the winding axis, the wound electrode assembly is divided into four equal parts in a longitudinal direction, namely, a first region, a second region, a third region, and a fourth region. In the longitudinal direction, the first region, the second region, the third region, and the fourth region are arranged in this order. The first separator starts winding in the second region and ends winding in the third region. The second separator starts winding in the third region and ends winding in the third region. The positive electrode plate starts winding in the second region and ends winding in the second region. The negative electrode plate starts winding in the third region and ends winding in the second region.

[5] In the cross section perpendicular to the winding axis, a distance between two points located farthest apart from each other on an outline of the wound electrode assembly may be 59 mm or less, for example.

In the present disclosure, this dimension is also called "a height dimension". In the present disclosure, the distance between two points located farthest apart from each other, on an outline of the wound electrode assembly, in a direction perpendicular to a straight line defining a height dimension is also called "a thickness dimension".

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Next, an embodiment of the present disclosure (also called "the present embodiment" hereinafter) will be described. It should be noted that the below description does not limit the scope of claims.

Any geometric term in the present specification (such as "perpendicular", for example) should not be interpreted solely in its exact meaning. For example, "perpendicular" may mean a geometric state that is deviated, to some extent, from exact "perpendicular". Any geometric term in the present specification may include tolerances and/or errors in terms of design, operation, production, and/or the like.

The dimensional relationship in each figure may not necessarily coincide with the actual dimensional relationship. The dimensional relationship (in length, width, thickness, and the like) in each figure may have been changed for the purpose of assisting the understanding.

In the present specification, a numerical range such as "from 10 mm to 44 mm" includes both the upper limit and the lower limit, unless otherwise specified. For example, "from 10 mm to 44 mm" means a numerical range of "not less than 10 mm and not more than 44 mm". Moreover, any numerical value selected from the numerical range may be used as a new upper limit and/or a new lower limit. For example, any numerical value within the numerical range and any numerical value described in another location of the present specification may be combined to create a new numerical range.

<Battery>

Figure 4:
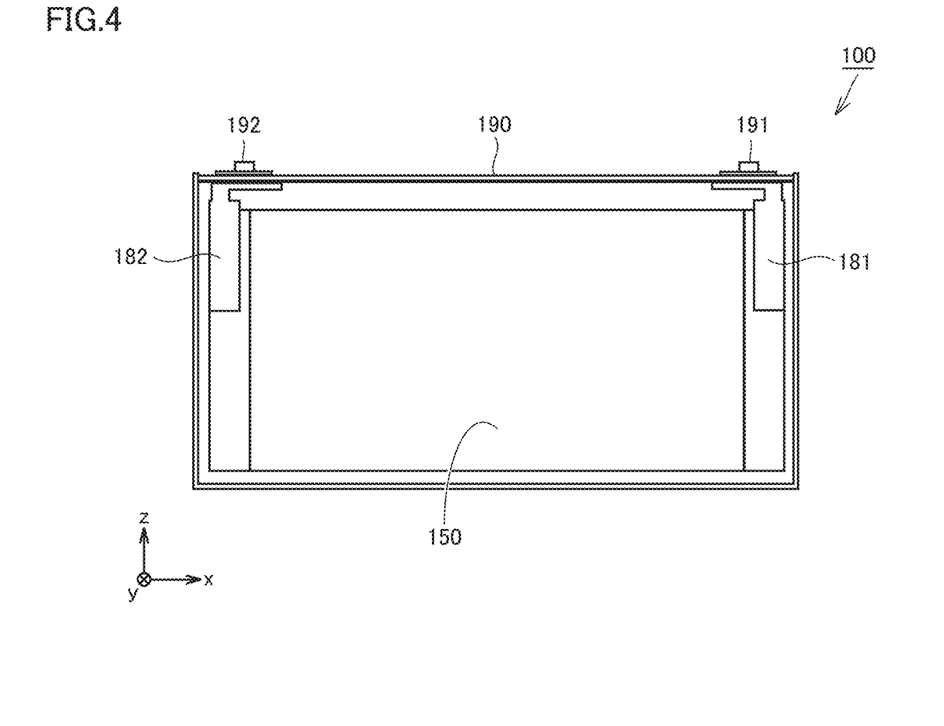
FIG. 4 is a schematic view illustrating an example configuration of a battery according to the present embodiment.

FIG. 4 is a schematic view illustrating an example configuration of a battery according to the present embodiment.

A battery 100 may be any type of battery. Battery 100 may be a lithium-ion battery and/or the like, for example. Battery 100 may be used in any applications. For example, battery 100 may be used as a main electric power supply or a motive force assisting electric power supply in an electric vehicle. A plurality of batteries 100 (cells) may be connected together to form a battery module or a battery pack.

Battery 100 includes a housing 190. Housing 190 is a container made of metal. Housing 190 is prismatic (a flat, rectangular parallelepiped). However, housing 190 may have any configuration. Housing 190 may be, for example, a pouch made of an aluminum-laminated film.

Housing 190 accommodates a wound electrode assembly 150 and an electrolyte (not illustrated). Wound electrode assembly 150 is connected to a positive electrode terminal 191 via a positive electrode current-collecting member 181. Wound electrode assembly 150 is connected to a negative electrode terminal 192 via a negative electrode current-collecting member 182. The electrolyte may be a liquid electrolyte (an electrolyte solution, an ionic liquid), or may be a gelled electrolyte, for example.

<<Wound Electrode Assembly>>

Figure 5:
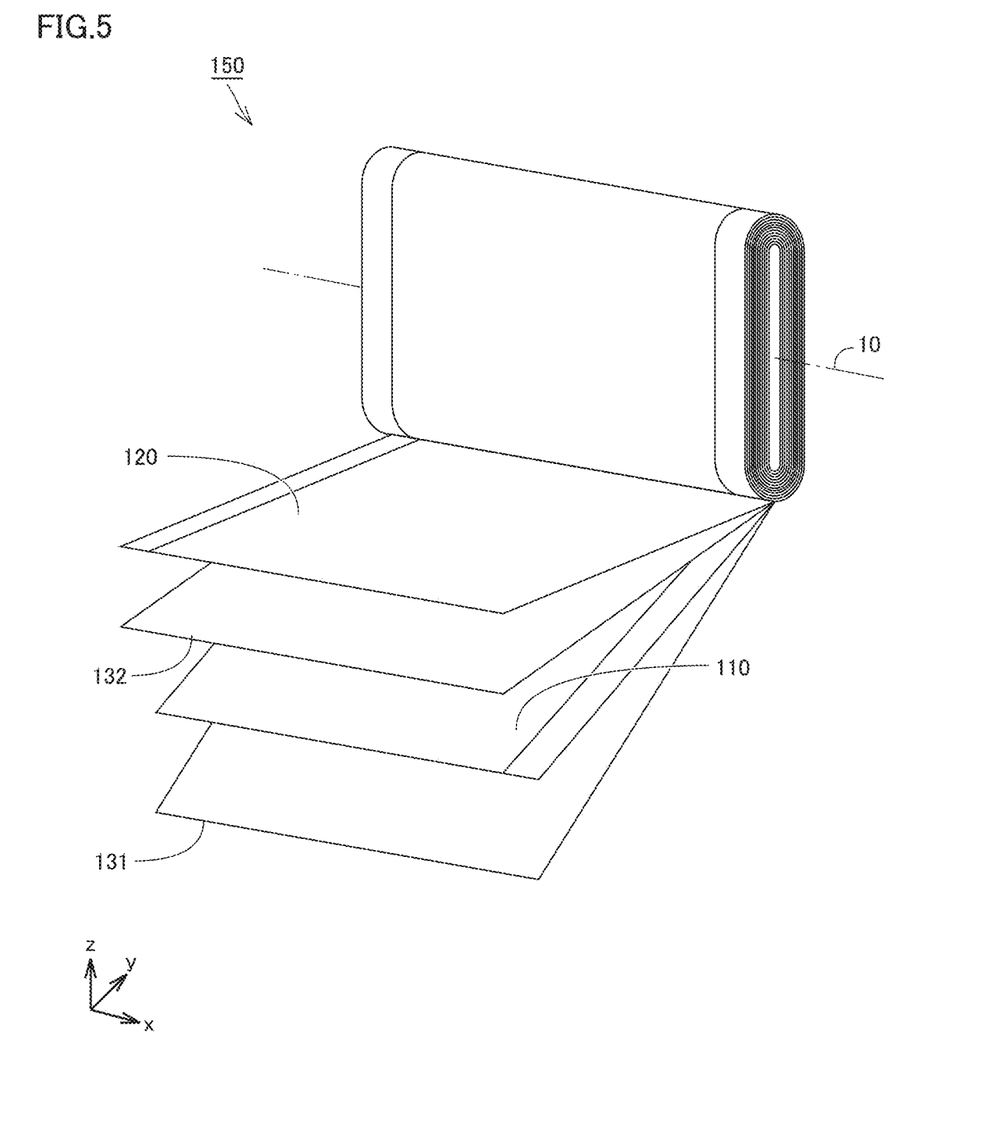
FIG. 5 is a schematic view illustrating a wound electrode assembly according to the present embodiment.

FIG. 5 is a schematic view illustrating a wound electrode assembly according to the present embodiment.

Wound electrode assembly 150 has a flat shape. Wound electrode assembly 150 includes a first separator 131, a positive electrode plate 110, a second separator 132, and a negative electrode plate 120. Each of first separator 131, positive electrode plate 110, second separator 132, and negative electrode plate 120 is a belt-shaped sheet. First separator 131, positive electrode plate 110, second separator 132, and negative electrode plate 120 are stacked in this order. The stacked body consisting of first separator 131, positive electrode plate 110, second separator 132, and negative electrode plate 120 is wound spirally around a winding axis 10.

Positive electrode plate 110 may be formed by, for example, placing a positive electrode active material on a surface of a metal foil. Positive electrode plate 110 may have a thickness from 50 μm to 100 μm, for example. Negative electrode plate 120 may be formed by, for example, placing a negative electrode active material on a surface of a metal foil. Negative electrode plate 120 may have a thickness from 50 μm to 100 μm, for example. In the present specification, the positive electrode plate and the negative electrode plate may be collectively called "the electrode plate". The material and the like of the separator are described below.

Figure 6:
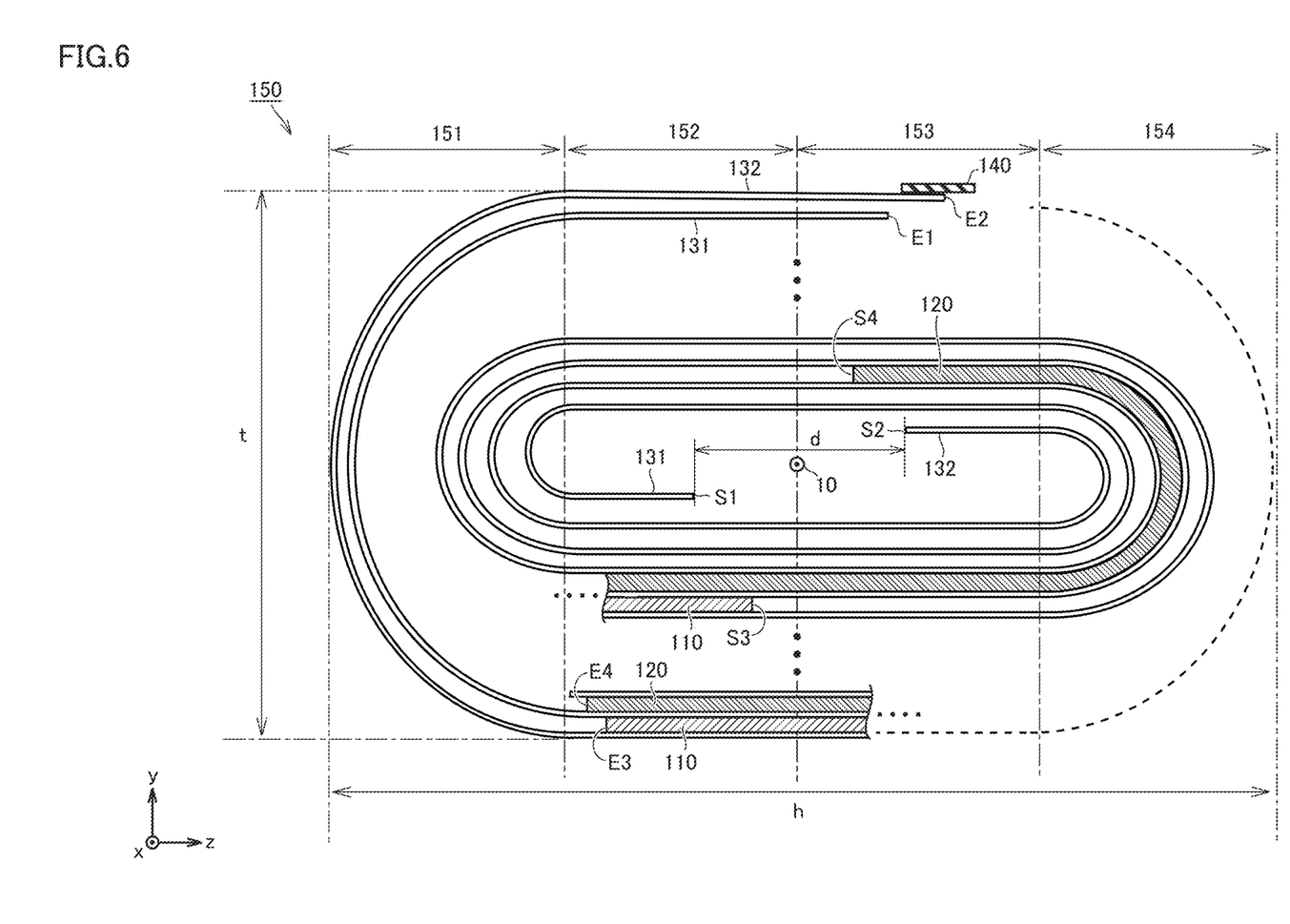
FIG. 6 is a schematic cross-sectional view illustrating a wound electrode assembly according to the present embodiment.

FIG. 6 is a schematic cross-sectional view illustrating a wound electrode assembly according to the present embodiment.

In FIG. 6, a cross section perpendicular to winding axis 10 is shown. Winding axis 10 extends in a direction perpendicular to the surface of the paper (namely, in the x-axis direction). First separator 131 has a first winding start edge S1 inside an innermost circumference of wound electrode assembly 150. Second separator 132 has a second winding start edge S2 inside the innermost circumference of wound electrode assembly 150. First winding start edge Si faces second winding start edge S2 with winding axis 10 interposed therebetween. First winding start edge S1 is located apart from second winding start edge S2. In the present embodiment, it is expected that the folding and/or overlapping of the separator at first winding start edge Si and second winding start edge S2 is unlikely to occur.

For the sake of convenience in creating the drawing, FIG. 6 is depicted in such a way that the position of first winding start edge Si is different from the position of second winding start edge S2 in the y-axis direction. In actuality, however, the position of first winding start edge S1 may be substantially the same as the position of second winding start edge S2 in the y-axis direction. For the sake of convenience in the creation of the drawing as well as in the explanation about it, the electrode plate and the separator are partially omitted in FIG. 6. The number of winding depicted in FIG. 6 is merely an example. Wound electrode assembly 150 may be formed with any number of winding.

<<Clearance Distance>>

In the present embodiment, the distance between first winding start edge S1 and second winding start edge S2 is also called "clearance distance d". It is expected that, the longer the clearance distance d is, the less likely the folding and/or overlapping of the separator inside the innermost circumference is to occur. In the present embodiment, clearance distance d is more than 0 mm. Clearance distance d may be 5 mm or more, for example. Clearance distance d may be 10 mm or more, for example. When the clearance distance d is too long, it may affect the formability, a thickness dimension t, and the like of wound electrode assembly 150, for example. Clearance distance d may be 44 mm or less, for example.

Clearance distance d may be measured by the following procedure. Wound electrode assembly 150 is embedded in a resin. The resin may be an epoxy resin and/or the like, for example. Wound electrode assembly 150 thus embedded in the resin is cut to prepare a cross-sectional sample. The cross-sectional sample includes a cross section perpendicular to winding axis 10 (FIG. 6). An optical microscope is used to measure clearance distance d inside the innermost circumference of wound electrode assembly 150.

<<Winding Start Position and Winding End Position of Each Member>>

Wound electrode assembly 150 in FIG. 6 includes a first region 151, a second region 152, a third region 153, and a fourth region 154. That is, wound electrode assembly 150 is divided in a longitudinal direction (in the z-axis direction in FIG. 6) into four equal parts, which are first region 151, second region 152, third region 153, and fourth region 154. In the longitudinal direction, first region 151, second region 152, third region 153, and fourth region 154 are arranged in this order.

First region 151, second region 152, third region 153, and fourth region 154 are contiguously arranged in series. First region 151 and fourth region 154 are located at both ends, respectively, in the longitudinal direction. Each of first region 151 and fourth region 154 includes a curved portion (an R portion, or a corner portion). In the curved portion, the electrode plate and the separator have curved surfaces. On the boundary between second region 152 and third region 153, winding axis 10 is located. Each of second region 152 and third region 153 includes a flat portion. In the flat portion, the electrode plate and the separator have flat surfaces.

First separator 131 starts winding in second region 152 and ends winding in third region 153. In other words, first separator 131 has first winding start edge S1 in second region 152, and first separator 131 has a first winding end edge E1 in third region 153.

Second separator 132 starts winding in third region 153 and ends winding in third region 153. In other words, second separator 132 has second winding start edge S2 in third region 153, and second separator 132 has a second winding end edge E2 in third region 153. Second winding end edge E2 may be secured with the use of an adhesive tape 140, for example.

Positive electrode plate 110 starts winding in second region 152 and ends winding in second region 152. In other words, positive electrode plate 110 has a third winding start edge S3 in second region 152, and positive electrode plate 110 has a third winding end edge E3 in second region 152.

Negative electrode plate 120 starts winding in third region 153 and ends winding in second region 152. In other words, negative electrode plate 120 has a fourth winding start edge S4 in third region 153, and negative electrode plate 120 has a fourth winding end edge E4 in second region 152.

<<Height Dimension>>

Wound electrode assembly 150 may have a height dimension h of 59 mm or less, for example. Wound electrode assembly 150 may have a height dimension h from 56 mm to 59 mm, for example. In FIG. 6, height dimension h depicts a distance between two points located farthest apart from each other on an outline of wound electrode assembly 150.

A distance between two points located farthest apart from each other, on an outline of wound electrode assembly 150, in a direction perpendicular to a straight line defining height dimension h is "a thickness dimension t". When the separator is folded and/or overlapped inside the innermost circumference of wound electrode assembly 150, thickness dimension t may be too large.

<<Separator>>

First separator 131 and second separator 132 may have substantially the same material, dimensions, and physical properties. First separator 131 and second separator 132 may have different material, dimensions, and physical properties from each other.

The separator may be made of polyolefin, for example. The separator may be made of polyethylene (PE) or may be made of polypropylene (PP), for example. The separator may have a monolayer structure. The separator may consist of a PE layer, for example. The separator may have a multilayer structure. The separator may include a PP layer, a PE layer, and a PP layer, for example. The PP layer, the PE layer, and the PP layer may be stacked in this order.

The separator may have a thickness of 20 μm or less, or may have a thickness of 18 μm or less, or may have a thickness of 16 μm or less, for example. The separator may have a thickness from 16 μm to 20 μm, for example. In other words, each of first separator 131 and second separator 132 may have a thickness of 20 μm or less.

For the purpose of enhancing power output and capacity, for example, use of a thin separator may be sometimes requested. The thinner the separator is, the less rigid it tends to be. When the separator has a low rigidity, the separator tends to go downward when core 170 is pulled out of wound electrode assembly 150. When the separator goes downward, folding and/or overlapping of the separator tends to occur at the time of pressing.

Figure 7:
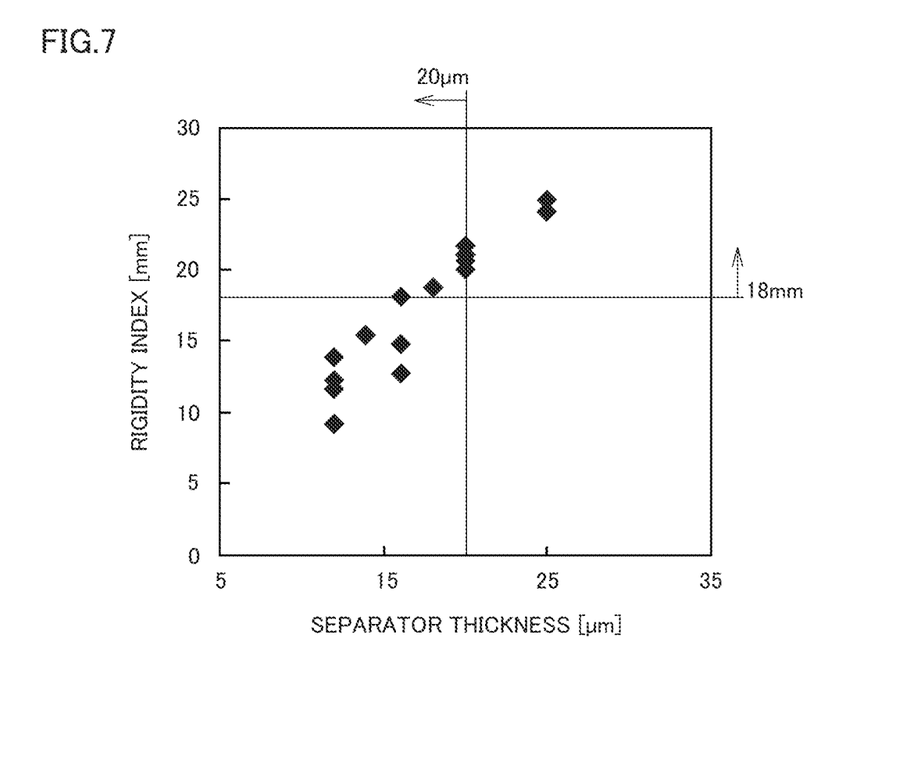
FIG. 7 is a graph illustrating an example of the relationship between the thickness and the rigidity index of a separator.

FIG. 7 is a graph illustrating an example of the relationship between the thickness and the rigidity index of a separator.

As seen in FIG. 7, the thinner the separator is, the smaller the rigidity index tends to be. The rigidity index is an index of the rigidity of the separator. The greater the rigidity index is, the greater the rigidity of the separator is evaluated. The separator may have a rigidity index from 9 mm to 25 mm, for example. The separator may have a rigidity index from 17.2 mm to 19.2 mm, for example. When the separator has a rigidity index of 18 mm or more, the separator tends not to go downward. Each of first separator 131 and second separator 132 may have a rigidity index of 18 mm or more. Each of first separator 131 and second separator 132 may have a rigidity index from 18 mm to 21 mm, for example. Each of first separator 131 and second separator 132 may have a rigidity index from 18 mm to 19.2 mm, for example. The rigidity index is measured by the procedure described below.

Figure 8:
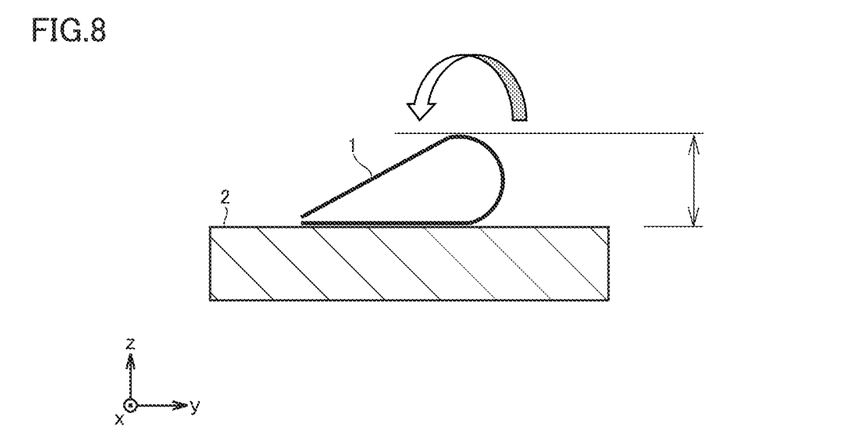
FIG. 8 is a schematic cross-sectional view illustrating a method of measuring a rigidity index.

FIG. 8 is a schematic cross-sectional view illustrating a method of measuring a rigidity index.

The separator is cut to prepare sample segments 1. Three or more sample segments 1 are prepared. The planar shape of each sample segment 1 is rectangular. Each sample segment 1 has a length dimension of 30 cm. The dimension in the direction perpendicular to a straight line defining the length dimension may be from 100 mm to 130 mm, for example. A predetermined platform 2 is prepared. Platform 2 has a flat surface. Sample segment 1 is placed on a surface of platform 2. Sample segment 1 is 180-degree folded back, without leaving a crease in sample segment 1. Both ends of sample segment 1 in a longitudinal direction are joined together. The height of the folded portion of sample segment 1 from the surface of platform 2 is measured. This height is the rigidity index. The rigidity index is measured for the three or more sample segments 1. The arithmetic mean of these three or more rigidity index values is regarded as the rigidity index of the separator. The rigidity index (unit, mm) is significant to one decimal place. It is rounded to one decimal place.

<<Winding-up Test>>

Figure 9:
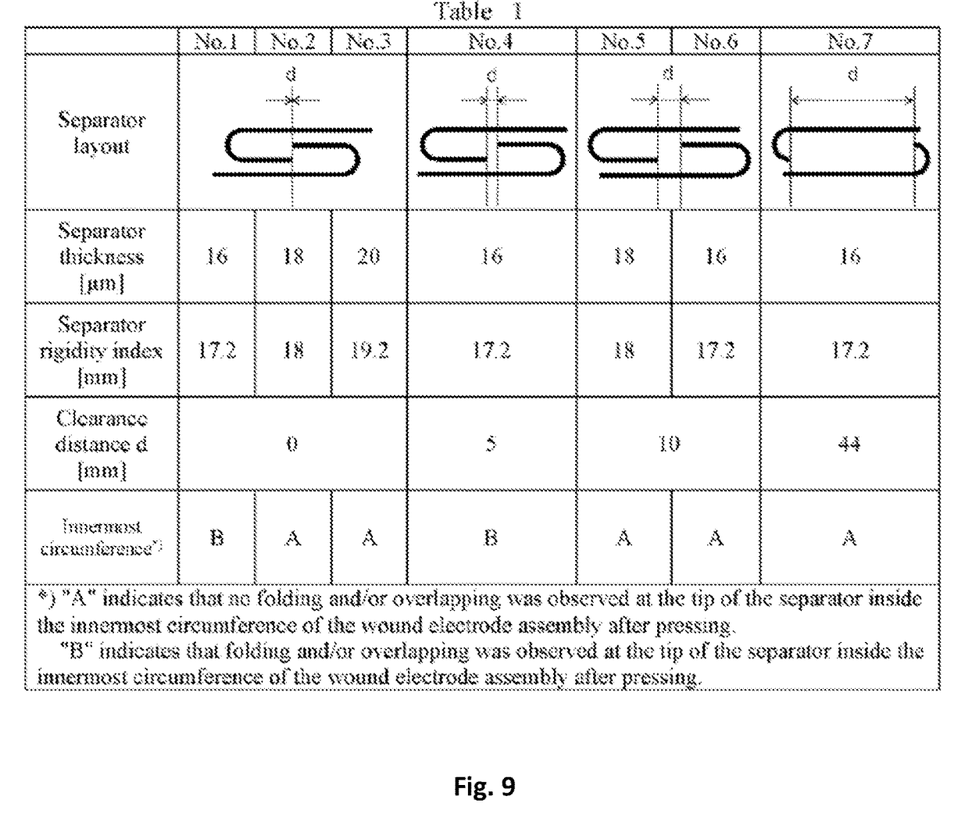
FIG. 9 is a table indicating test checks based on the influence of "Separator thickness", "Separator rigidity index", and "Clearance distance d".

Wound electrode assemblies 150 (No. 1 to No. 7) listed in Table 1 of FIG. 9 are produced. As seen in Table 1 of FIG. 9, this test checks the influence of "Separator thickness", "Separator rigidity index", and "Clearance distance d" on the folding and/or overlapping of the separator inside the innermost circumference. In this test, first separator 131 has the same thickness and rigidity index as those of second separator 132.

As seen for No. 1 to No. 3, when clearance distance d is small, the thinner the separator is and the smaller the rigidity index is, the more likely the folding and/or overlapping of the separator is to occur.

As seen for No. 4 to No. 7, when clearance distance d is great, even when the rigidity index of the separator is small, the folding and/or overlapping of the separator tends not to occur.

The present embodiment is illustrative in any respect. The present embodiment is non-restrictive. For example, it is expected that certain configurations of the present embodiments can be optionally combined.

The technical scope defined by the terms of the claims encompasses any modifications within the meaning equivalent to the terms of the claims. The technical scope defined by the terms of the claims also encompasses any modifications within the scope equivalent to the terms of the claims.

What is claimed is:

1. A battery comprising:
a wound electrode assembly, wherein
the wound electrode assembly has a flat shape,
the wound electrode assembly includes a first separator, a positive electrode plate, a second separator, and a negative electrode plate,
the first separator, the positive electrode plate, the second separator, and the negative electrode plate are stacked in this order and then wound spirally,
in a cross section perpendicular to a winding axis of the wound electrode assembly,
the first separator has a first winding start edge inside an innermost circumference of the wound electrode assembly,
the second separator has a second winding start edge inside the innermost circumference of the wound electrode assembly,
the first winding start edge faces the second winding start edge, in a direction parallel to a straight line connecting two points located farthest apart from each other on an outline of the wound electrode assembly, with the winding axis interposed therebetween, and
the first winding start edge is located apart from the second winding start edge.

2. The battery according to claim 1, wherein
each of the first separator and the second separator has:
a thickness of 20 μm or less; and
a rigidity index of 18 mm or more, and
the rigidity index means a height of the separator, having a length of 30 cm, from a surface of a platform when the separator is placed on the platform and folded back with both edges joined together and with no crease.

3. The battery according to claim 1, wherein a distance between the first winding start edge and the second winding start edge is from 10 mm to 44 mm.

4. The battery according to claim 1, wherein
in the cross section perpendicular to the winding axis,
the wound electrode assembly is divided into four equal parts in a longitudinal direction, the four equal parts being a first region, a second region, a third region, and a fourth region,
in the longitudinal direction, the first region, the second region, the third region, and the fourth region are arranged in this order,
the first separator starts winding in the second region and ends winding in the third region,
the second separator starts winding in the third region and ends winding in the third region,
the positive electrode plate starts winding in the second region and ends winding in the second region, and
the negative electrode plate starts winding in the third region and ends winding in the second region.

5. The battery according to claim 4, wherein
in the cross section perpendicular to the winding axis,
a distance between two points located farthest apart from each other on an outline of the wound electrode assembly is 59 mm or less.

6. A battery comprising:
a wound electrode assembly, wherein
  the wound electrode assembly has a flat shape,
  the wound electrode assembly includes a first separator, a positive electrode plate,
a second separator, and a negative electrode plate,
  the first separator, the positive electrode plate, the second separator, and the negative electrode plate are stacked in this order and then wound spirally,
  in a cross section perpendicular to a winding axis of the wound electrode assembly,
    the first separator has a first winding start edge inside an innermost circumference of the wound electrode assembly,
    the second separator has a second winding start edge inside the innermost circumference of the wound electrode assembly,
    the first winding start edge faces the second winding start edge with the winding axis interposed therebetween, and
    the first winding start edge is located apart from the second winding start edge,
  wherein
  in the cross section perpendicular to the winding axis,
    the wound electrode assembly is divided into four equal parts in a longitudinal direction, the four equal parts being a first region, a second region, a third region, and a fourth region,
    in the longitudinal direction, the first region, the second region, the third region, and the fourth region are arranged in this order,
    the first separator starts winding in the second region and ends winding in the third region,
    the second separator starts winding in the third region and ends winding in the third region,
    the positive electrode plate starts winding in the second region and ends winding in the second region, and
    the negative electrode plate starts winding in the third region and ends winding in the second region.

7. The battery according to claim 6, wherein
in the cross section perpendicular to the winding axis,
a distance between two points located farthest apart from each other on an outline of the wound electrode assembly is 59 mm or less.

\* \* \* \* \*